United States Patent [19]

Terashita

[11] Patent Number: 4,641,959
[45] Date of Patent: Feb. 10, 1987

[54] METHOD FOR DETERMINING EXPOSURE AMOUNT IN PHOTOGRAPHIC PRINTING

[75] Inventor: Takaaki Terashita, Kaisei, Japan

[73] Assignee: Fuji Photo Film Co., Ltd., Minami-ashigara, Japan

[21] Appl. No.: 828,374

[22] Filed: Feb. 11, 1986

[30] Foreign Application Priority Data

Feb. 27, 1985 [JP] Japan .................................. 60-38526
Mar. 28, 1985 [JP] Japan .................................. 60-62027
Apr. 8, 1985 [JP] Japan .................................. 60-73795

[51] Int. Cl.$^4$ ........................ G03B 27/32; G03B 27/80
[52] U.S. Cl. ......................................... 355/77; 355/38
[58] Field of Search ............................. 355/77, 35, 38

[56] References Cited

U.S. PATENT DOCUMENTS 4,154,523 5/1979 Rising et al. ........................... 355/38
4,168,120 9/1979 Freier et al. ........................... 355/77
4,344,704 8/1982 Thurm et al. ........................... 355/77
4,416,539 11/1983 Terashita ............................... 355/77

Primary Examiner—Monroe H. Hayes
Attorney, Agent, or Firm—Wenderoth, Lind & Ponack

[57] ABSTRACT

In conventional photographic printing process, LATDs are photometrically measured for three primary colors of a color original picture to control the amount of transmitting light at a given level. Although this method of LATD control can produce excellent prints with good color balance for standard color negative films, it often produces defective prints with pool color balance for the original film frames which are dominated with specific colors. This invention method can control the color and the density optimally, remove color failures on objects, and distinguish films influenced with a color of a light source from the films with color failure to thereby provide optimum prints with minimum density fluctuation.

19 Claims, 10 Drawing Figures

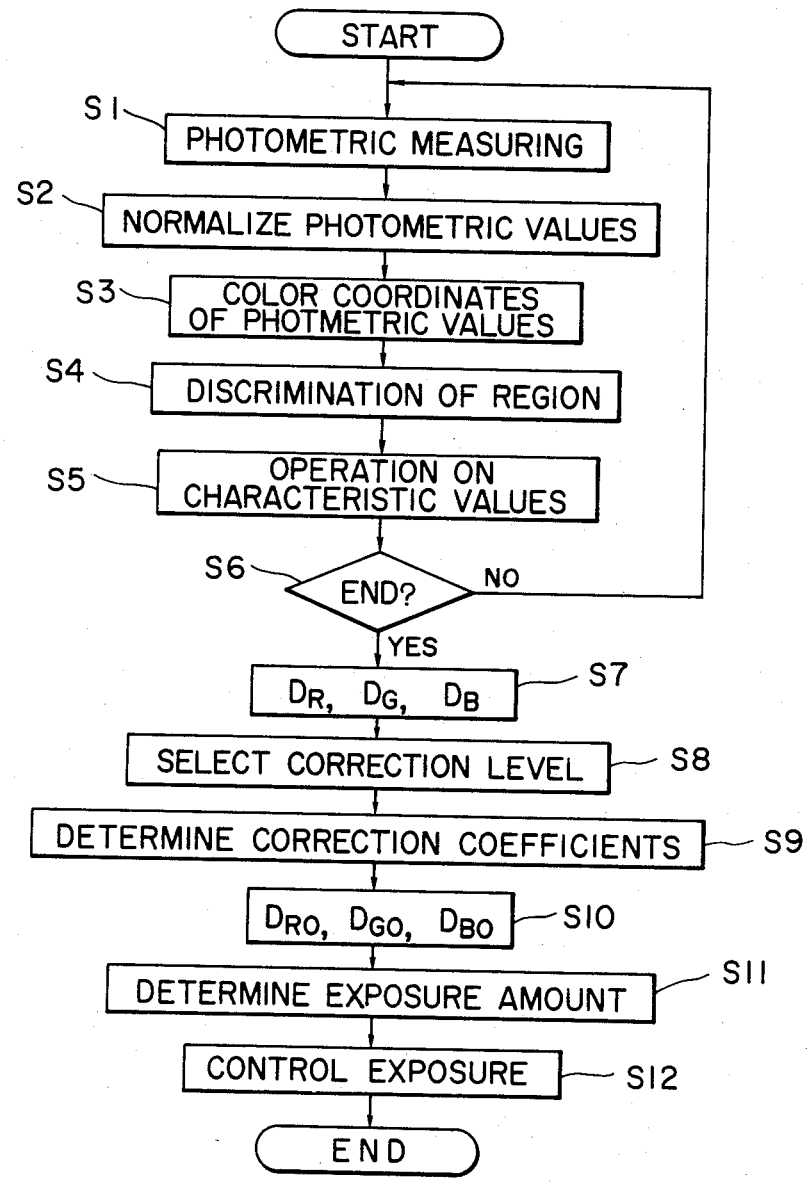

METHOD FOR DETERMINING EXPOSURE AMOUNT IN PHOTOGRAPHIC PRINTING

BACKGROUND OF THE INVENTION

This invention relates to a method for determining exposure amount in photographic printing.

It is empirically known that the LATDs (Large Area Transmittance Density) of three primary colors of R (red), G (green) and B (blue) of a color original picture on a standard negative film are substantially constant. In the prior art photographic printing system, LATDs of three primary colors are photometrically measured on a negative film which is to be printed to control the amount of transmittance at a constant value for the contents of three primary colors. The prior art printing system can produce prints of high quality with well balanced colors in this manner so long as the color negative film is a standard type.

The controlling method by means of LATD, however, is not always effective for color original films where a specific color is dominant, and tends to produce defective prints with poor color balance. Dominance of a color(s) on a color original film is attributable to irregular distribution of colors on a object, influence from different light sources, regression of latent images in a layer sensitive to a specific color, etc. The photographic printing system generally has correction levels such as lowered-correction level and full-correction level by which colors of the original film with a dominant color(s) are effectively corrected. More particularly, the lowered-correction method gives a relatively lowered-exposure to the contents with relatively high LATD in each of the three primary colors of the original film and is quite effective as a means of color correction to prevent color failure caused by uneven distribution of colors on an object. The full-correction method, on the other hand, controls the exposure so as to make the result of integration of three colors neutral in printing and is quite effective as a means of color correction for the original film of which latent images are chronologically fading in the layer sensitive to a specific color or the original film affected by different light sources.

There have been proposed several improved methods for determining exposure amount which select correction levels. For example, Japanese Patent Laid-open No. 156624/1977, No. 156625/1977 and No. 145620/1978 disclosed a method for using photometric points selectively. The exposure amount is obtained by the method using photometric points included within a skin color region which is defined with an ellipsoid or an ellipse on three- or two-dimensional coordinates. Japanese Patent Laid-open No. 12330/1978 discloses a method which is capable of reproducing a predetermined desired color(s) (for example, colors of skin and of sky, green color, color of snow, etc.) on a sheet of photographic color paper. However, these papers do not disclose anything about the method for printing by changing color correction levels or by removing the contents of color failure although it can determine the exposure amount by using extraction of the color of a specific object. The method is detrimental in that it is extremely difficult to extract the color of a specific object precisely, and that it does not solve the problem caused when the specific color of the object does not exist or when it is extracted erroneously even if it exists. Japanese Patent Publication No. 29847/1984 discloses a method for determining exposure amount without the points which are colored relatively darkly. More particularly, points are used in color correction only if they satisfy at least two of the following three conditions:

$$\left. \begin{array}{l} D_B - D_W \leqq D_{NB} - D_{NW} \pm d1 \\ D_G - D_W \leqq D_{NG} - D_{NW} \pm d2 \\ D_R - D_W \leqq D_{NR} - D_{NW} \pm d3 \end{array} \right\} \quad (1)$$

wherein $$D_W = (D_R + D_G + D_B)/3$$

$$D_{NW} = (D_{NR} + D_{NG} + D_{NB})/3$$

As this method does not use color coordinates, it is extremely difficult to change discriminating conditions by hues. Further, a problem exists in that the colors of which left term in the above expression (1) is very small or the colors of yellow, magenta and cyan are unconditionally selected. Under the condition of "$D_B - D_G \leqq D_{NB} - D_{NG} \pm d1$, $D_R - D_G \leqq D_{NR} - D_{NG} \pm d1$", the colors for the main of yellow, cyan and green are unconditionally selected. The method allows only a limited selection of photometric points and hence, is not very effective in removing the color failure components.

Japanese Patent Publication No. 15492/1981 describes a method of determining exposure amount which photometrically measures a frame for each predetermined segment, examines whether or not one of three primary colors is predominant, and if it is, the color is not used in determining exposure amount. For examining whether or not one of the primary colors is predominant, the ratios between two colors or B/G, G/R, R/B are compared with reference values. But the data on hues is not used as it does not use color coordinates. More particularly, according to this method, such information as related to different light sources (e.g. flourescent lamp, tungusten light, etc.) or to chronological changes on film (magenta) is excluded in determination of exposure amount. The method unavoidably prints film based on quite limited and sometimes erroneous data on photometric points. For instance, in the case of film exposed with a tungusten lamp, complementary colors mainly of the color of the light source are used as printing information and these colors are printed in colors similar to neutral, inconveniently enhancing the color of the tungusten lamp. Such error often occurs when not only different light sources are used but also when exposure is made with the light sources of low color temperature such as sunset or winter season. These films should be corrected in neutral gray color based mainly on the light source color points as well as the chronological color change points.

The method for determining exposure amount disclosed in Japanese Patent Laid-open No. 220760/1984 tries to improve discrimination of main hues in an under-exposed film by comparing the chromaticity of a photometric spot for the least dense portion with a marginal value and judging whether or not to use the value. It also attempts to reduce the dependency on the types of film. The paper, however, does not disclose anything about the improvement on the serious defects caused by films of different light sources or films with chronological color change. The method is also defective in that it takes much time in calculation as it requires to obtain distance between the center of each photometric spot and the vertex of a clor vector. Since this method uses the light-est point (or mask density) as the original point, it does not take into consideration the difference in sensitivity balance between red sensitive layer, green sensitive layer and blue sensitive layer and in gradient. The method therefore cannot distinguish main hues beyond a certain limit as it cannot precisely specify colors in terms of chromaticity based on the film type and the exposure amount at photographing time.

According to the above known methods, when the number of photometric points used in exposure amount determination is small, either photometric points of a reference original picture are used in the number to make up the number or no specific consideration is given at all. If the number of photometric points is small, the precision and stability of the exposure amount become low and the control of the exposure based upon them is improper. Even if the number of photometric points used is not very small, they are detrimental. For instance, images including blue sky or blue sea which need not be printed less densely are automatically printed lightly as those points are removed in advance. On the other hand, images including snow or cloudy sky which should be lightly printed are darkly printed as they are not removed in advance. As blue sky and blue sea tend to have hues similar to those of snow or cloudy sky, the density will inconveniently and widely change by the changes in film characteristics or in their saturation. The background of an object centering around the region which is marginal whether or not to be used in exposure control is liable to cause changes in density. Therefore, the prior art methods exclusively control either color balance or do not include such factors at all. There has long been felt a demand for a method for determining exposure amount which will not change the print of density by the types of images even if the number of photometric points is small.

There has been known a method for determining exposure amount which uses a correction amount predetermined by classification of features of color original pictures. Such methods are disclosed in Japanese Patent Laid-open No. 26568/1980, No. 26569/1980, No. 26570/1980 and No. 26571/1980. The methods examine the film consecutively by criteria such as the one with color failure, the one exposed with a fluorescent lamp, the one exposed with a tungsten lamp, an over-exposed one, an under-exposed one, a film with chronological changes, the one exposed at high color temperature, or the one exposed at low color temperature, allowing some overlaps between the criteria. But the methods have problems as the color correction factors are classified according to causes and complicate the methods inevitably. Although the methods theoretically distinguish the film exposed with a tungsten light from the film exposed at a low color temperature or the film exposed with an artificial light from a film with chronological changes, such classification per se is very difficult to make and there often are the case a film is not classified in either categories. The methods decribed above further do not show sufficient correction performance toward a red curtain under a fluorescent lamp, for example. Although it attempts to detect the color of the light source by examining the hues of skin color under various light sources and the same at the maximum density, these criteria in characteristic values are highly variable by the changes in film characteristics, color registration of three colors and color mixture when more than two color objects exist on one photometric point or various noises. As this method classifies films by the logical combination of characteristic values thus obtained, a film which almost but not quite satisfies a condition will be automatically excluded from an aimed category. Under such circumstances, there has long been awaited a method with an improved classification precision which can produce excellent prints with well balanced colors.

SUMMARY OF THE INVENTION

This invention was contrived to obviate aforementioned defects and aims at providing a method for determining an appropriate exposure amount in photographic printing which can properly control the colors in producing color prints, can minimize, if not remove, color failures and can distinguish the film with the color failure from the film exposed with different light sources.

Another object of this invention is to provide a method for determining the exposure amount in photographic printing which can properly control the density in producing color prints and can produce optimum color prints with minimum density variation.

According to this invention in one aspect thereof, for achieving objects described above, there is provided a method for determining exposure amount in photographic printing which comprises the steps of: photometrically measuring either the whole or a part of a frame picture of an original film in divided fine segments; obtaining a color coordinate from said photometric data; determining whether said color coordinate exists in or outside of a region on a predetermined color coordinate; obtaining a first color region data of said color coordinate inside said region and a second color region data of said color coordinate outside said region; and determining the exposure amount based upon a value obtained by respectively multiplying said first and second color region data with coefficients and sequentially adding the resulted products.

According to this invention in another aspect thereof, there is provided a method for determining exposure amount in photographic printing which comprises the steps of: photometrically measuring either the whole or a part of a frame picture of an original film in divided fine segments; dividing a color coordinate which has axes in combination of red, green and blue colors to a plurality of group regions by a region information in advance stored in a memory; determining to which the group said photometric data belongs on the color coordinate, obtaining color region data from said photometric data for each of said group regions; and determining the exposure amount based upon a value obtained by respectively multiplying each of said color region data with coefficients and sequentially adding the resulted products.

Further, according to this invention in another aspect thereof, there is provided a method for determining exposure amount in photographic printing which comprises the steps of: photometrically measuring the whole or a part of a frame picture of an original film in divided fine segments; dividing a color coordinate which has axes in combination of red, green and blue colors to a plurality of group regions by a region information in advance stored in a memory; determining to which the group regions said photometric data belongs on the color coordinate; and determining exposure amount by means of photometric data which is converted in a manner to make the data on high saturation region achromatic color data.

According to this invention in still another aspect thereof, there is provided a method for determining exposure amount in photographic printing which comprises the steps of: photometrically measuring the whole or a part of a frame picture of an original film in divided fine segments; dividing a color coordinate which has axes in combination of red, green and blue colors to a plurality of group regions by a region information in advance stored in a memory; determining to which the group regions being preset in a plural number on the color coordinate said photometric data belongs; obtaining characteristic values such as a number, an average value, a maximum density and so on of said photometric data for each of said group regions; classifying said original film in terms of images according to said characteristic values; determining coefficients in accordance with said image classification; and determining the exposure amount based upon a value obtained by respectively multiplying converted values of said average values or converted values of partial average values with said coefficient and sequentially adding the resulted products.

Still further, according to this invention in still another aspect thereof, there is provided a method for determining exposure amount in photographic printing which comprises the stseps of: photometrically measuring the whole or a part of a frame picture of an original film in divided fine segment; dividing a color coordinate which has axes in combination of red, green mand blue colors to a plurality of group regions by a region information in advance stored in a memory; determining to which the group regions on the color coordinate thus obtained photometric data belongs; obtaining characteristic values as a number, average values, a maximum density of said photometric data for each of said group regions; multiplying the converted values of said average values or converted values of a part of said average with coefficients; sequentially adding the resulted products; converting the added values based upon the image classification determined according to said characteristic values; and determining the exposure amount based upon the converted values.

The nature, principle and utility of the invention will become more apparent from the following detailed description when read in conjunction with the accompanying drawings.

BRIEF DESCRIPTION OF THE DRAWING

In the accompanying drawings:

FIG. 5 is a flow chart showing operation according to this invention method;

FIG. 9A is a graph to show the characteristics of the prior art LATD exposure while

DETAILED DESCRIPTION OF THE PREFERRED EMBODIMENTS

Figure 1:
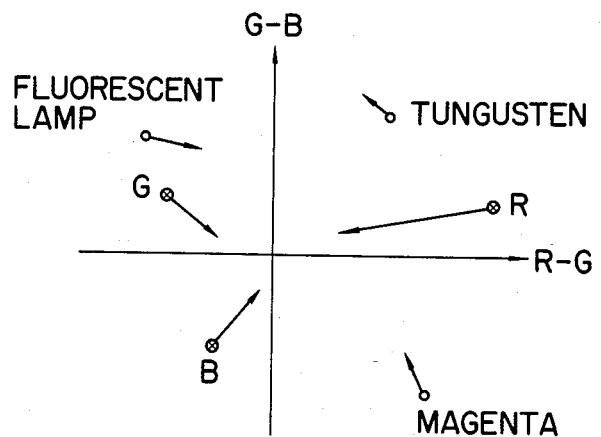
FIG. 1 is a chart of color coordinates to expalin the principle of this invention.

FIG. 1 shows on color coordinates of R-G:G-B the colors (R,B,C) which have high probability to cause color failures, the color (M) caused by the chronological change of color on a film and the light source color influenced by a light source (fluorescent lamp, tungsten light), and the color (G) for which it is difficult to distinguish color failure from color of light sources. Further, FIG. 1 shows the changes in average density before and after the removal of photometric points. More specifically, in Fig. 1  denotes light sources and images of changed colors while Ⓧ denotes images with color failures. Whereas the images with color failures show a value close to gray, changes in light source or in images with faded colors are small. This suggests that it is possible to ovbiate the component colors on color failure without affecting or minimizing the effect on images having colors of light sources or faded colors.

Figure 2:
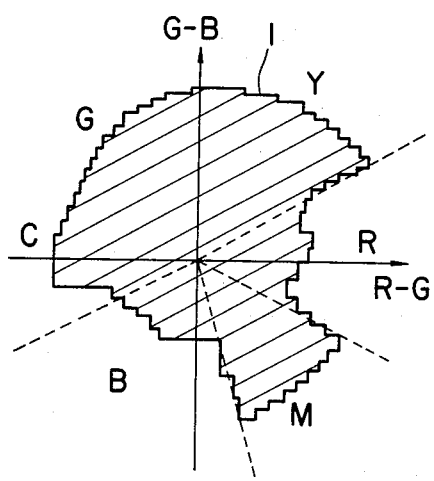
FIGS. 2 and 3 are charts respectively to show examples of area setting on color coordinates according to this invention.
Figure 3:
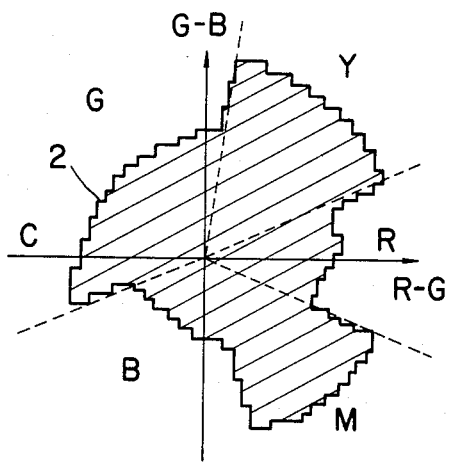

This invention takes note of the relation between the color coordinates R-G:G-B and the color failure on a picture of an original film, sets a region 1 including a fluorescent lamp, a tungusten light and magenta on a color coordinate as shown in FIG. 2, and distinguishes photometric points of the original film by whether the point exists inside or outside (namely the region of high saturation, et seq.) the region 1 and then processes the result in arithmetic operation. The region 1 in FIG. 2 shows an example of region setting on an area having film original pictures exposed with fluorescent lamps. Since it is almost impossible to distinguish between the fluorescent lamp from green grass or from green leaves, a wider region is allocated to the color green G. In the region 2 as shown in FIG. 3, conversely, as the number of film originals exposed with fluorescent lamps is small, a narrower region is allocated as the green region to remove color failures of the green G.

Figure 4:
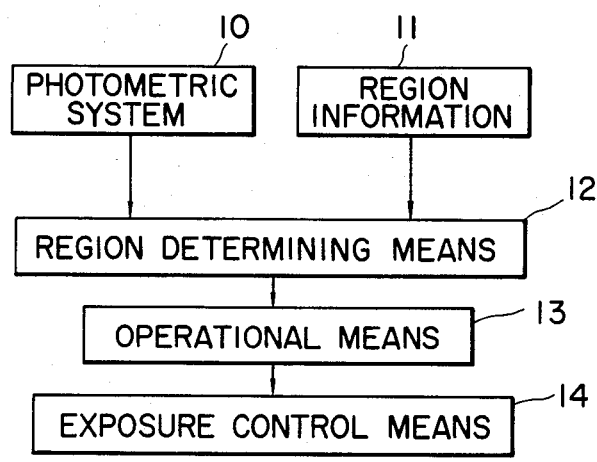
FIG. 4 is a block diagram to show an embodiment of the device which realizes this invention method.

FIG. 4 is a block diagram of a device according to this invention used for classifying the photometric data of film original pictures and determining exposure amount by reference to the region 1 or 2 set on such color coordinate. The photometric data from a photometric system 10 and the region information 11 (e.g. region is numbered for each chromaticity point) about either the region 1 or 2 stored in a memory are inputted to a region determining means 12 to determine which point belongs to which regions. By discriminating a point as either inside or outside of the region, the photometric data are processed with an operational means 13 (which is to be described hereinafter). The exposure amount determined by the operational means 13 is inputted to an exposure control means 14 to expose film original pictures. The region determining means 12 determines a region to which the photometric point belongs simply by referring to a data table of region information 11 after obtaining the chromaticity of the points. The determining method may be the one disclosed in Japanese Patent Laid-open No. 208422/1982. The determining method is capable of determining regions in shorter time than the prior art method and of setting the color region arbitrarily. Plural regions can be set in the direction of saturation which will be described hereinafter. The method is convenient in that it can set and analyse detailed factors in hues and sturation.

An embodiment of this invention method will now be described referring to the flow chart in FIG. 5. It is assumed herein that the region 1 shown in FIG. 2 and other regions outside thereof on a color coordinate are stored in a memory.

Figure 8:
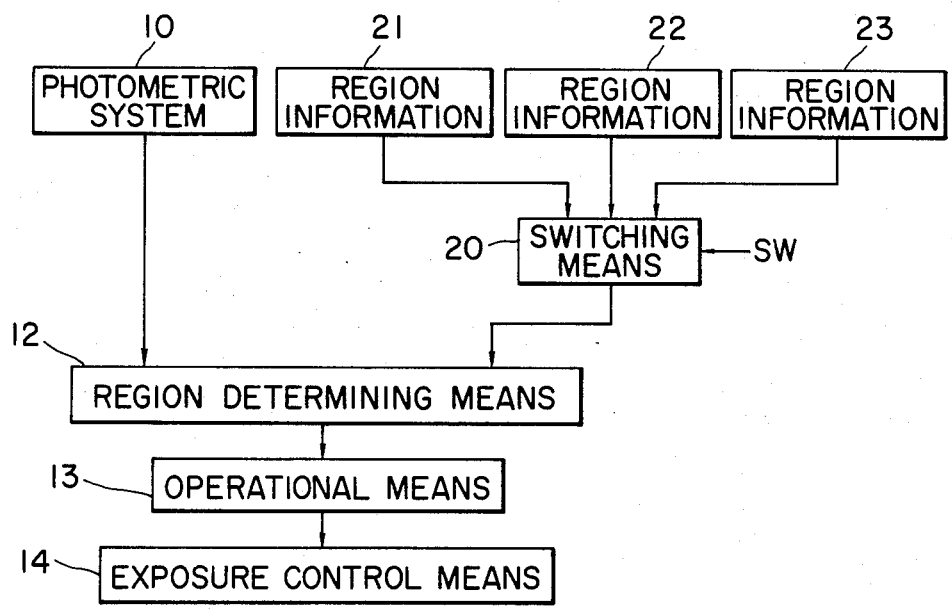
FIG. 8 is a block diagram to show another embodiment of this invention.

According to this invention, a film original picture is photometrically measured along scanning lines SL with a two-dimensional image sensor or a line sensor in segments divided by a large number of pixels Sn as shown in FIG. 8 (Step S1). The photometric values of each pixel are then normalized (Step S2) by a method such as the one disclosed in Japanese Patent Laid-open No. 1039/1981. The normalization allows the same color coordinate to be used for different color densities or different color types and the selection of arbitrary colors as the original point of the coordinate. The photometric measurement on each pixel Sn is conducted for three primary colors of RGB, the photometric values of each color is calculated to learn by which position on the color coordinate the value is expressed, and whether the point exists inside or outside of the region 1 is discriminated (Steps S3 and S4). The operation on characteristic values in each pixel is repeated until when all the photometric processing end (Steps S5 and S6). More particularly, if it is assumed that the number of pixels for photometry is n, the number of photometric data within the regions is expressed as i, and if the number of the photometric data outside the region 1 is j, the number of the data is expressed as i+j=n. The average density $D_i$ of each pixel in the region 1 and the average density $D_j$ of the pixel outside the region 1 are calculated by an operational means 13 such as a microcomputer. The density D on the film original picture can be obtained by multiplying coefficients Ka and Kb with the average densities $D_i$ and $D_j$ as below.

$$\left. \begin{array}{l} D = Ka \cdot D_i + Kb \cdot D_j \\ Ka + Kb = 1.0 \end{array} \right\} \quad (2)$$

Figure 6:
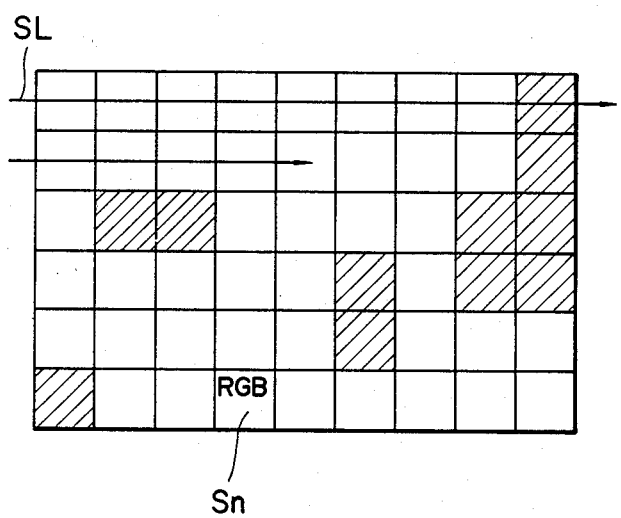
FIG. 6 is a chart to show photometry of a frame of an original film.

As the influence of the coefficients Ka and Kb should be strong inside the region 1 while it should be small outside it, the coefficient Ka should be in the range of 1.0 to 0.6 and the coefficient Kb in the range of 0.0 to 0.4. The above expression (2) expresses generally the density data, and in practice it should be calculated for each of the three primary colors of RGB. The density values of each of the colors are obtained as $D_R$, $D_G$ and $D_B$ in Step S7. If it is assumed that in the pixel data shown in FIG. 6, the hatched pixels represent the data inside the region 1 and the pixels without oblique stripes express the data outside the region 1, the average density $D_i$ of the hatched pixels and the average density $D_j$ of other pixels should be obtained for each of the three primary colors of RGB. It is more effective to convert the data on other pixels into other data (e.g. an average value of the average densities of three primary colors outside the region) and use the same as $D_i$ rather than using the data on outside the region as they are. When the average value of the densities of three primary colors is used as $D_j$, even if the number of i is not very large, the precision of the density value D is excellent and the changes in print density can be restricted to minimum. The coefficients Ka and Kb are not limited to the aforementioned scope but may be coefficients which are in proportion to the number of data.

The above mentioned method is effective for removing the color component of the color failure. However, there still remains problems as objects existing on or around the boundaries of the region 1 in the color coordinate, for instance sky or sea, fluctuate widely and sometimes belong to the region 1 or to outside the region depending on the types of films, fluctuation of characteristics or the particular color of the sky or sea. The density ratio among the three primary colors of $D_i$ in the above expression (2) is stable, but the density changes inconveniently in a wide margin.

Such defects may be obviated by the following method. In short, the problem can be solved by holding the relation expressed in the expression (2A).

$$\left. \begin{array}{l} D = Ka \cdot D_i + Kb \cdot D_{jw} \\ 0 < Ka, Kb < 2.0 \end{array} \right\} \quad (2A)$$

Wherein $D_{jW}$ is a value obtained from the average density of RGB of $D_j$ and used commonly in the expression for obtaining $D_R$, $D_G$ and $D_B$. In addition to the above, G average densities among $D_j$, the mean values of the average densities of RGB of $D_j$, or the values expressing achromatic colors such as the mean of the maximum and the minimum of the average densities of RGB of $D_j$ may be used as $D_{jW}$. Further, the mean value of RGB of $D_i$ and $D_j$ may be used similarly. In place of $D_i$ in the above mentioned expression (2A), the three primary color ratio or difference may be used as color balance at $D_i$. Some of the examples are shown below.

$$\left. \begin{array}{l} D_R = Ka \cdot (D_{iR} - D_{iG}) + Kb \cdot D_{jw} \\ D_G = \quad\quad\quad\quad\quad\quad\quad Kb \cdot D_{jw} \\ D_B = Ka \cdot (D_{iB} - D_{iG}) + Kb \cdot D_{jw} \end{array} \right\} \quad (2B)$$

$$\left. \begin{array}{l} D_R = Ka \cdot (D_{iR}/D_{iG}) \cdot D_{iw} + Kb \cdot D_{jw} \\ D_G = Ka \cdot D_{iw} \quad\quad\quad\quad + Kb \cdot D_{jw} \\ D_B = Ka \cdot (D_{iB}/D_{iG}) \cdot D_{iw} + Kb \cdot D_{jw} \end{array} \right\} \quad (2C)$$

According to the above mentioned methods, smaller the number i of the photometric data is, the more possible become both the exposure control similar to the conventional lowered-correction and the restriction on changes in print density, thereby quite easily solving the problems in the prior art. In the above the value $D_{jw}$ which is common to $D_R$, $D_G$ and $D_B$ is used as the value expressing achromatic colors, but it is not limited to the achromatic colors in strict sense. Any values may be used for preventing the density fluctuation in the average $D_i$ so long as it is a density correction control value obtained from the average values of each type of the group regions. This invention therefore includes all the methods for this purpose.

The operational means 13 processes thus obtained average density values $D_R$, $D_G$ and $D_B$ of the frame of the three primary colors by using the color correction expressions such as below;

$$\left. \begin{array}{l} D_{R0} = D_0 + K_R \cdot (D_R - D_0) \\ D_{G0} = D_0 + K_G \cdot (D_G - D_0) \\ D_{B0} = D_0 + K_B \cdot (D_B - D_0) \end{array} \right\} \quad (3)$$

wherein $D_0 = (a \cdot D_R + b \cdot D_G + c \cdot D_B)/(a+b+c)$ $$\begin{bmatrix} D_{R0} \\ D_{G0} \\ D_{B0} \end{bmatrix} = \begin{bmatrix} K11 & K12 & K13 \\ K21 & K22 & K23 \\ K31 & K32 & K33 \end{bmatrix} \begin{bmatrix} D_R \\ D_G \\ D_B \end{bmatrix} \quad (4)$$

With the exposure amount $D_{R0}$, $D_{G0}$ and $D_{B0}$, the exposure control means 14 expose images.

The coefficients $K_R$, $K_G$ and $K_B$ in the above expression (3) and those K11 through K33 in the expression (4) are color correction coefficients. Plural predetermined coefficient groups may be selected visually or discriminated by a correction level discriminant formula with a function $f(N_i, MX_i)$ which is a discriminant functional expression which discriminates between high-correction level, normal-correction level or lowered-correction level. $N_i$ in the function $f(N_i, MX_i)$ denotes the number of pixels within the region and $MX_i$ the maximum density in the region. $N_i$ and $MX_i$ in each region may be obtained concurrently with the average density of each region by the characteristic value operating section (Step S5). Such discriminant functional expression is widely used as a statistical method. It is, for example, described in detail in the "Multivariable Analysis" (Nikkagiren shuppan Sha in Japan, 1971). Classification of correction levels (which is to be described hereinafdter) may be made by roughly classifying them by the position of images on the color coordinate or the average densities, the distribution of pixel numbers $N_i$, and then by determining the class by a functional expression for each class. The rough classification mentioned above preferably includes at least more than one of object groups exposed with a tungusten lamp or with a fluorescent lamp. The correction level is selected as above (Step S8), and correction coefficients of either the expression (3) or (4) are determined (Step S9). Exposure amount $D_{R0}$, $D_{G0}$ and $D_{B0}$ to be sent to the exposure control means 14 are obtained (Step S10), and exposure is controlled after the final determination of the exposure amount (Steps S11 and S12). In the case such as the one shown in FIG. 3, correction level may not be changed but be fixed at an appropriate level.

Figure 7:
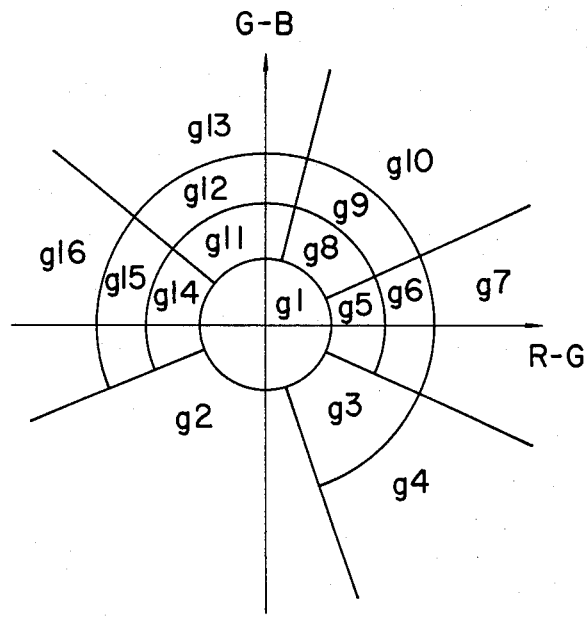
FIG. 7 is a chart to show another area setting on color coordinates according to this invention.

Although a color coordinate is divided into two regions and an average density of the data measured photometically in both regions is obtained in the above example, many (three or more) group regions e.g. g1 through g16 may be set and characteristic values such as average density may be calculated for each region as shown in FIG. 7. In such a case, a photometric data is judged which region of the group regions g1 through g16 the data belongs by the region determining means 12, and average densities $D_1$ through $D_{16}$ or $N_1$ through $N_{16}$ or $MX_1$ through $MX_{16}$ are obtained for each of the group regions. Using K1 through K16 as the coefficient of each group region, the average density D for each of the three primary colors may be obtained by the formula below.

$$D = K1 \cdot D1 + K2 \cdot D2 + \ldots + K15 \cdot D15 + K16 \cdot D16 \quad (5)$$

wherein $K1 + K2 \ldots + K16 = 1.0$.

In an average type of frame pictures which amateur photographers tend to choose, a coefficient should be weighted heavier in proportion to the distance of its region from the origin of the color coordinates shown in FIG. 7 and in counter proportion to the distance of its region from the region of an average color of the film frame. These coefficients may be obtained by statistical method (for intance, the method of least squares) so as to achieve optimum prints. Further, it is effective to change the values of coefficients depending on the types of the films such as films exposed with different light sources, films with fading images or other films. For instance, if a film frame is classified the one photographed with a fluorescent lamp, larger values are given as the coefficients K12 and K13 while if it is classified as the one taken against the green background, smaller values may be given as the coefficients K12 and K13 or the average densities of D12 and D13 may be converted to a value of achromatic color or similar thereto and may be used.

As this method corrects colors on the color coordinate for hues and saturation in the expressions (3) and (4) described above, it can correct colors more precisely and minutely than the conventional methods. When plural groups of coefficients are preset so that one of them is selected in this method, the selection can be done more effectively if the function $f(N_i, MX_i)$ is used. Although the method by means of converted $D_j$ in relation to the expression (2) is used, the average density of high saturation areas may be converted similarly for the expression (5). The methods which can solve the problems of unstable density and which are described for the expression (2) may be also used for the expression (5). For instance, in FIG. 7, the regions, g1, g3, g4, g5, g8, g9, g11, g12 and g14 are set as the regions to be used to control colors and other regions are used to control density. For the regions $D_2$, $D_6$, $D_7$, $D_{10}$, $D_{13}$, $D_{15}$ and $D_{16}$, use one of the average densities of RGB colors of each region or a value obtained therefrom for all of the values $D_R$, $D_G$ and $D_B$. In this case, the coefficients k1 through k16 should be different from K1 through K16, respectively. It is more effective to use different coefficients for each one of the regions for controlling the densities. For instance, a relatively small coefficient is preferable for the region g2 which has large number of sky and sea, but a relatively large coefficient should be given to the areas g15 or g16 which have a large number of green mountains or green grass. As the regions g6 and g7 include highly saturated red, a relatively large coefficient may be given. These adjustment may be effected by the result of image analysis of image patterns, or scenes and so on.

The method described above is the one which separates without overlapping the photometric data for controlling the colors from those for controlling the density. Alternatively, the photometric data on the region g1 of FIG. 7 may be used doubly as the data for color as well as for density. As the photometric data on the region g1 includes sky and snow, it is preferable to change the density control coefficient depending on the result of the image analysis. The data to be used for the density control in this method is not limited to the data on highly saturated points but may be photometric data on the regions g1 and g2. The expression (5) may be converted to the one similar to the expressions (2A) through (2C) by dividing it roughly into the term controlling the colors and the term controlling the density. By selecting appropriate terms and the coefficients thereof for the density correction control, a print density identical to the one obtained by LATD method in the prior art can be achieved. Then, an improvement should be made only for the color control. Such the improvement is necessary for the manual correction of density in the prior art. A skilled worker with much experience conventionally observes film images and determines amount of light for exposure amount when a high quality print is required. When the correction tendency changes, however, the skilled worker cannot adapt himself enough to the change and a confusion may arise. This invention is highly effective to save such situation.

Detailed description will now be given to the method for classifying images with characteristic values obtained from the segmented regions on the color coordinate by position of an image on the color coordinate, chromaticity of the average density thereof, or the position of area which includes the largest number of photometric points on the color coordinate, for example. More specifically, they are classified into groups of tungsten lamp light or yellow, of fluorescent lamp color or green, of cloudy light or blue, or of faded colors or red. Classes may not be set for the images in the areas where a coefficient of which value is constantly smaller than that of highly saturated areas or density values thereof are converted to achromatic color values. By classifying roughly images first, an optimum correction discriminant formula $f(N_i, MX_i)$ can be selected. Then, with using this functional expression $f(N_i, MX_i)$, the images are further classified into lowered-correction images, normal-correction images or high-correction images. Alternatively, the images can be classified into those photographed with artificial light, images of chronological changes or other images. Many variation and modification can be possibly made to the method.

Explanation will now be given to the method of discriminating the images photographed with a fluorescent lamp from those taken against green background. Under the fluorescent light, the values of $N_{11}$ and $N_{12}$ are large whereas that of $N_1$, $N_8$, $N_5$ and $N_2$ are zero or a almost zero. The values of $MX_{11}$ and $MX_{12}$ are large while that of $MX_1$, $MX_8$, $MX_5$, $MX_3$ or $MX_2$ are zero or almost zero similarly. The coefficients K11 and K12 for the areas photographed under the fluoroescent lamp should be controlled to be a larger value in exposure control based on the light source color. In the case of images of green, the values of $N_{14}$ and $N_{15}$ are large while that of $N_1$, $N_8$, $N_5$, $N_3$ and $N_2$ are often not zero. The values of $MX_{14}$, $MX_{15}$ are relatively small while that of $MX_1$, $MX_8$, $MX_5$, $MX_3$ and $MX_2$ are large. Therefore, the color with a fluorescent lamp can be distinguished from the color of green by the functional expression of single or combined values of $N_1$, $N_2$, $N_5$, $N_8$, $N_{11}$, $N_{12}$, $N_{14}$, $N_{15}$, $MX_1$, $MX_2$, $MX_5$, $MX_8$, $MX_{11}$, $MX_{12}$, $MX_{14}$ and $MX_{15}$. The characteristic values used in the functional expression are not necessarily used in all of the color areas but may be selected effectively depending on the images to be discriminated. The ratios such as $N_{14}/N_{11}$, or $N_{15}/N_{12}$ may be used in such a functional expression. The precision in discrimination will be further enhanced if the average density or hue thereof, the number of shadows or highlights or their hues are included in the functional expression. The coefficients K14 and K15 are set to be a small value for the images of green while that of K1 to be large. This suggests the hue angle in the images with a fluorescent lamp is generally smaller than that in green, and the color green in the images of turf exists on the side of shadow while the color green in the images with a fluorescent lamp exists on the side of highlight. Under the fluorescent lamp, the number of gray and complementary color for the light source becomes extremely small. Since the images photographed under the fluorescent lamp does not generally have a gray point, the relation holds as $MX_1 = 0$. If the gray point exists, it should be in the shadow portion where the color of the light source does not influence or to be the color complementary to the color of the light source and the value of $MX_1$ in such a case becomes an extremely small value. The images photographed against the background of green, on the other hand, has a high $MX_1$ in a white cloth, sky, earth, a portion of skin. The relation is similar to the relation between images exposed with a light source other than day light and the images with color failure or the similarity can be exploited on the discrimination. The hues of the maximum density or skin under various light sources which are used as criteria in the conventional discrimination are effective only for classification of specified images, but the maximum density in the gray region according to this invention may be effective in any type of images. The above relation can naturally be discriminated easily by logical expressions, but in this invention functional expression can enhance the precision and stability in discrimination. More particularly, if the discriminant formula for the fluorescent lamp is $V1 = f_1(N_i, MX_i)$ and the discriminant formula for the green area is $V2 = f_2(N_i MX_i)$, when the discriminant formula V1 is larger than the discriminant formula V2, the film is discriminated as the one exposed under fluorescent lamp while when the discriminant formula V2 is larger than the discriminant formula V1, it is discriminated as the film of green. When using such a discriminant formula, even if a small number of characteristic values does not express features of the fluorescent lamp, if other large number of characteristic values show that of the fluorescent lamp, then the film can be discriminated as the one. This invention can remove almost all of the color failures caused under artificial light sources or faded images. If the difference between the above mentioned discriminant formula V1 and V2 is obtained in advance, and if that is larger than a preset value, the images are discriminated to be the one exposed with the fluorescent lamp, if it is smaller than another preset value, it is discriminated to be the image against the background of green, and if it lies between the aforementioned two preset values, the images should be discriminated to be the images in an undecided area or a normal correction area.

Similarly, the film photographed under a tungusten lamp can be discriminated from the one with yellow color failure. The characteristic values in each color area used in this case are naturally different from the one used in the above. If necessary, by similar technique, color failure of magenta or red (such as azalea, pink cloth or furniture) can be discriminated from the images blurred with formalin or the color failures with blue (such as blue sky, sea or clothes) can be discriminated from the objects imaged in cloudy climate or in shadow. The coefficients may be determined according to the result of such discrimination. They may be automatically calculated based on the result of discrimination.

Although coefficients are determined for each of the color regions in the above embodiment, the color correction coefficients may be determined for frame characteristic amount (such as average frame density) for determining the exposed amount according to the above discriminated result.

According to this invention, a frame picture is divided into a plurality of color regions according to hues and saturations, characteristic values of each region are obtained, images of a film are classified according to light sources or colors which might cause color failures by using the functional expressions of the above characteristic values, and weighted coefficients for determination of the exposure amount are obtained by the image classification. This invention is capable of more stable and more precise classification thanks to the novel image classification method. The influence of erroneous discrimination can be minimized by selecting the coefficients based on the result of the classification. The colors which are possible causes of color failures are removed from the color regions in advance where discrimination between the color of light source and the component color of color failure is not needed to thereby allow highly precise color control and hence, production of high quality prints.

FIG. 8 shows another embodiment according to this invention wherein plural types of regions as shown in FIGS. 2, 3 and 7 are separately set on a color coordinate, and one of them is selectively outputted with a switching signal SW from a switching means 20 so that the determination on the processing of the photometric data from the above mentioned photometric system 10 made by the region determining means 12 may be freely selected therewith. As this invention presets the plural types of regions 21 through 23 in advance so that an operator may select arbitrarily one of them according to his preference to feed the same to the region determining means 12, exposure amount can be determined more freely for printing.

Although the regions are plotted on the color coordinate with R-G on the horizontal axis and with G-B on the vertical axis in the above description, other coordinate systems such as a polar coordinate or a sex-tangle coordinate defined by hue angle and saturation may be used. In the bove description, the whole frame picture of a film original is used in photometry to determine color regions, but the color regions may be determined from the photometric spots at a central portion of a frame with many objects. Or it is possible to define photometric points by the difference in density or color from nearby spots. It is also possible to define a photometric region by degree of importance of objects or the type of density such as shdows or highlights. This method for determining the color regions is highly effective in discrimination of films photographed under a fluorescent lamp from those of green grass. It should preferably be selected depending on the purpose and type of objects. The description above is given to the printing process of a photographic negative film onto a photographic paper, however, this invention maybe effectively applied to duplication or reproduction of photographic original pictures to various systems or copying materials.

As stated in the foregoing, this invention can optimally control the colors in a color printing process to minimize the color failures on objects. In the prior art, three classes, i.e. high-correction level, normal-correction level and lowered-correction level are needed. This invention can reduce the number of classes into a smaller number such as high- and normal-correction or high- and lowered-correction or high-correction alone. It may entirely not need to conduct the correction classification atall. Even if the method needs correction classification, it does not necessitates a large amount of changes in correction, Therefore, the influence of erroneous discrimination can be minimized. The images with mixture of light sources and color failures could not be printed optimally in the prior art (for instance red carpet under a fluorescent lamp, the sun setting to the blue sea, etc.), but such prints can be beautifully done by this invention method which removes in advance the component color which possibly cause color failures. The conventional method for removing the color failure components inevitably deteriorates prints of different light source films and films of faded images, but this invention can remarkably improve the quality of prints by strictly defining the photometric points used in determination of exposure amount according to the hues and saturations. Simultaneously, this invention can analyse photometric data on the color coordinate by their hues and saturations to automatically remove colors (R, B and C) which have high probability to cause color failures, the color (magenta) caused by fading in film or the color (Y) of light source, or the color (green) difficult to distinguish between the color of a light source and that to cause color failure. This invention enables evaluation on photometric points at high speed by obtaining chromaticity of the obtained photometric spots but without the necessity of obtaining distance from the original point on the color chart. It also can set on the color coordinate the color regions of the patterns of an arbitrary shape and in an arbitrary to obtain highly precise density values for exposure control. As the invention method uses data on high saturation points partially, it can enhance stability and precision in densities used in controlling exposure. By using for controlling density the data which is not used in controlling colors, the precision and stability in exposure control densities are secured irrespective of the number of photometric points used or of the image types. This invention therefore solves the problems which are encountered in the prior art in control of color correction and density correction in photographic printing and produces high quality prints.

Figure 9A:
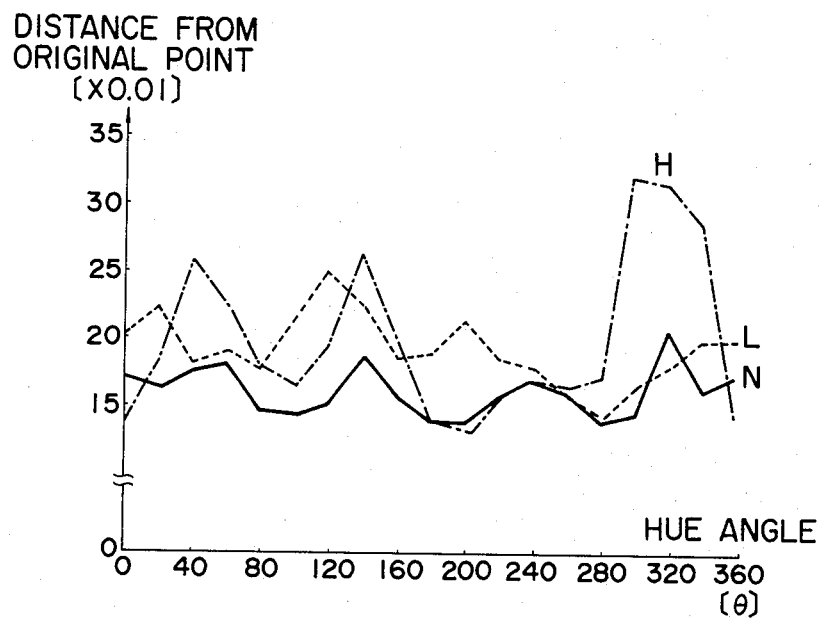
Figure 9B:
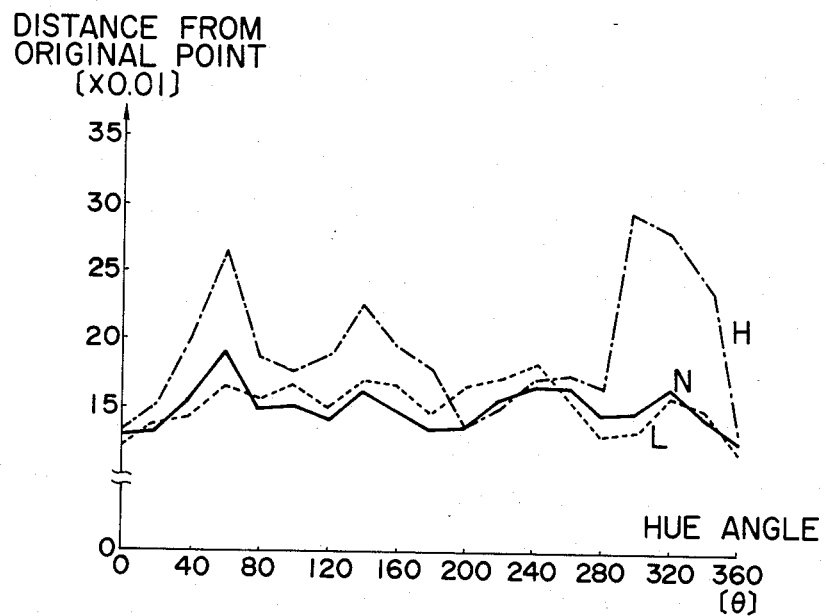
FIG. 9B is a graph to show the characcteristics of the exposure according to this invention.

FIG. 9A shows the conventional LATD method broken down by H-, N- and L-correction films whereas FIG. 9B shows the method according to this invention by correction levels. The hue angle ($\theta$) is plotted on the horizontal axis of the chart while the average of saturation at angle $\theta$ of frame average density obtained from large number of films is plotted on the vertical axis in terms of the distance from the original point. Comparing FIG. 9A with FIG. 9B, it is obvious that the average distance of lowered correction film L approaches the average distance of the normal correction film N without the necessity of shortening the average distance of the high correction film H over almost all angles $\theta$. This suggests that the contents of the color which possibly cause color failures are effectively removed so that the normal correction films can be printed at the same correction level as the lowered correction films.

It should be understood that many modifications and adaptations of the invention will become apparent to those skilled in the art and it is intended to encompass such obvious modifications and changes in the scope of the claims appended hereto.

What is claimed is:

1. A method for determining exposure amount in photographic printing which comprises the steps of:
    photometrically measuring either the whole or a part of a frame picture of an original film in divided fine segments;
    obtaining a color coordinate from said photometric data;

determining whether said color coordinate exists in or outside of a region on a predetermined color coordinate;

obtaining a first color region data of said color coordinate inside said region and a second color region data of said color coordinate outside said region; and determining the exposure amount based upon a value obtained by respectively multiplying said first and second color region data with coefficients and sequentially adding the resulted products.

2. The method for determining exposure amount in photographic printing as claimed in claim 1, wherein said first and second color region data are average values of said photometric data.

3. The method for determining exposure amount in photographic printing as claimed in claim 1, wherein said color coordinate is values on red, green and blue colors.

4. The method for determining exposure amount in photographic printing as claimed in claim 1, wherein said region includes light source colors of tungsten lamps and of fluorescent lamps and magenta color.

5. A method for determining exposure amount in photographic printing which comprises the steps of:

photometrically measuring the whole or a part of a frame picture of an original film in divided fine segments;

dividing a color coordinate which has axes in combination of red, green and blue colors to a plurality of group regions by a region information in advance stored in a memory;

determining to which the group regions said photometric data belongs on the color coordinate, obtaining color region data from said photometric data for each of said group regions; and determining the exposure amount based upon a value obtained by respectively multiplying each of said color region data with coefficients and sequentially adding the resulted products.

6. The method for determining exposure amount in photographic printing as claimed in claim 5, wherein said coefficients are preset in prural kinds for each group region so that one of the group regions may be arbitrarily selected.

7. The method for determining exposure amount in photographic printing as claimed in claim 5, wherein said color region data is average values of said photometric data.

8. A method for determining exposure amount in photographic printing which comprises the steps of;

presetting plural kinds of segment groups on a color coordinate;

selecting one of the segment groups;

comparing the selected group with the photometric data obtained by measuring the whole or a part of a frame picture of an original film in divided fine segments;

determining to which the segment group said photometric data belongs on the color coordinate;

obtaining color region data from said photometric data to the selected segment group; and determining the exposure amount based upon a value obtained by respectively multiplying each said color region data with coefficients respectively and sequentially adding the resulted products.

9. The method for determining exposure amount in photographic printing as claimed in claim 8, wherein said color region data is average values of said photometric data.

10. A method for determining exposure amount in photographic printing which comprises the steps of;

photometrically measuring the whole or a part of a frame picture of an original film in divided fine segments;

dividing a color coordinate which has axes in combination of red, green and blue colors to a plurality of group regions by a region information in advance stored in a memory;

determining to which the group regions said photometric data belongs on the color coordinate; and determining exposure amount by means of photometric data which is converted in a manner to make the data on high saturation region achromatic color data.

11. The method for determining exposure amount in photographic printing as claimed in claim 10, wherein average values of said photometric data are obtained for each of said group regions, the photometric data is converted so as to make the average values on the high saturation region achromatic color, and said exposure amount is determined by respectively multiplying each of said average values with coefficients and sequentially adding the resulted products.

12. The method for determining exposure amount in photographic printing as claimed in claim 10, which further includes the steps of:

obtaining average values of said photometric data for each of said group regions;

converting the average so that the color balance among red, green and blue at average values which do not belong to the group regions of high saturation and average values of either the whole or each of said groups become to achromatic color;

obtaining average values with the same or different weights for respective said group regions in the case of plural group regions; and determining the exposure amount based upon a value obtained by either adding or multiplying said color balance.

13. A method for determining exposure amount in photographic printing which comprises the steps of:

photometrically measuring density of the whole or a part of a frame picture of an original film for red, green and blue colors in divided fine segments:

dividing the photometric density data into data for controlling the colors and data for controlling the density in photographic printing exposure; and determining exposure amount based upon an average value of the photometric data for controlling the colors and an average value of the photometric data for controlling density.

14. The method for determining exposure amount in photographic printing as claimed in claim 13, wherein each of said average values is a weighted average.

15. A method for determining exposure amount in photographic printing which comprises the steps of:

photometrically measuring the whole or a part of a frame picture of an original film in divided fine segments;

dividing a color coordinate which has axes in combination of red, green and blue colors to a plurality of group regions by a region information in advance stored in a memory;

determining to which the group regions being preset in a plural number on the color coordinate said photometric data belongs;

obtaining characteristic values such as a number, an average value, a maximum value and so on of said photometric data for each of said group regions;

classifying said original film in terms of images according to said characteristic values;

determining coefficients in accordance with said image classification; and determining the exposure amount based upon a value obtained by respectively multiplying converted values of said average values or converted values of partial average values with said coefficient and sequentially adding the resulted products.

16. The method for determining exposure amount in photographic printing as claimed in claim 15, wherein said image classification is conducted by means of the number and the maximum value of said group regions so as to include at least either high-correction images or lowered-correction images thereby to determine said coefficients.

17. The method for determining exposure amount in photographic printing as claimed in claim 15, wherein said image classification is conducted by comparing the values obtained by a functional expression including the number and the maximum value of either each group regions or a specified group region with a reference value thereby to determine said coefficients.

18. The method for determining exposure amount in photographic printing as claimed in claim 15, wherein said image classification is conducted by a functional expression including the maximum value of a region of said group regions which belong to neutral colors.

19. A method for determining exposure amount in photographic printing which comprises the steps of:

photometrically measuring the whole or a part of a frame picture of an original film in divided fine segment;

dividing a color coordinate which has axes in combination of red, green and blue colors to a plurality of group regions by a region information in advance stored in a memory;

determining to which the group regions on the color coordinate thus obtained photometric data belongs;

obtaining characteristic values as a number, average values, a maximum value of said photometric data for each of said group regions;

multiplying the converted values of said average values or converted values of a part of said average values with coefficients;

sequentially adding the resulted products;

converting the added value based upon the image classification determined according to said characteristic values; and determining the exposure amount based upon the converted values.

* * * * *